March 26, 1929.  J. ZIMMERMAN  1,706,687
DEVICE FOR FACILITATING THE COUPLING OF PIPES
Filed Aug. 6, 1928
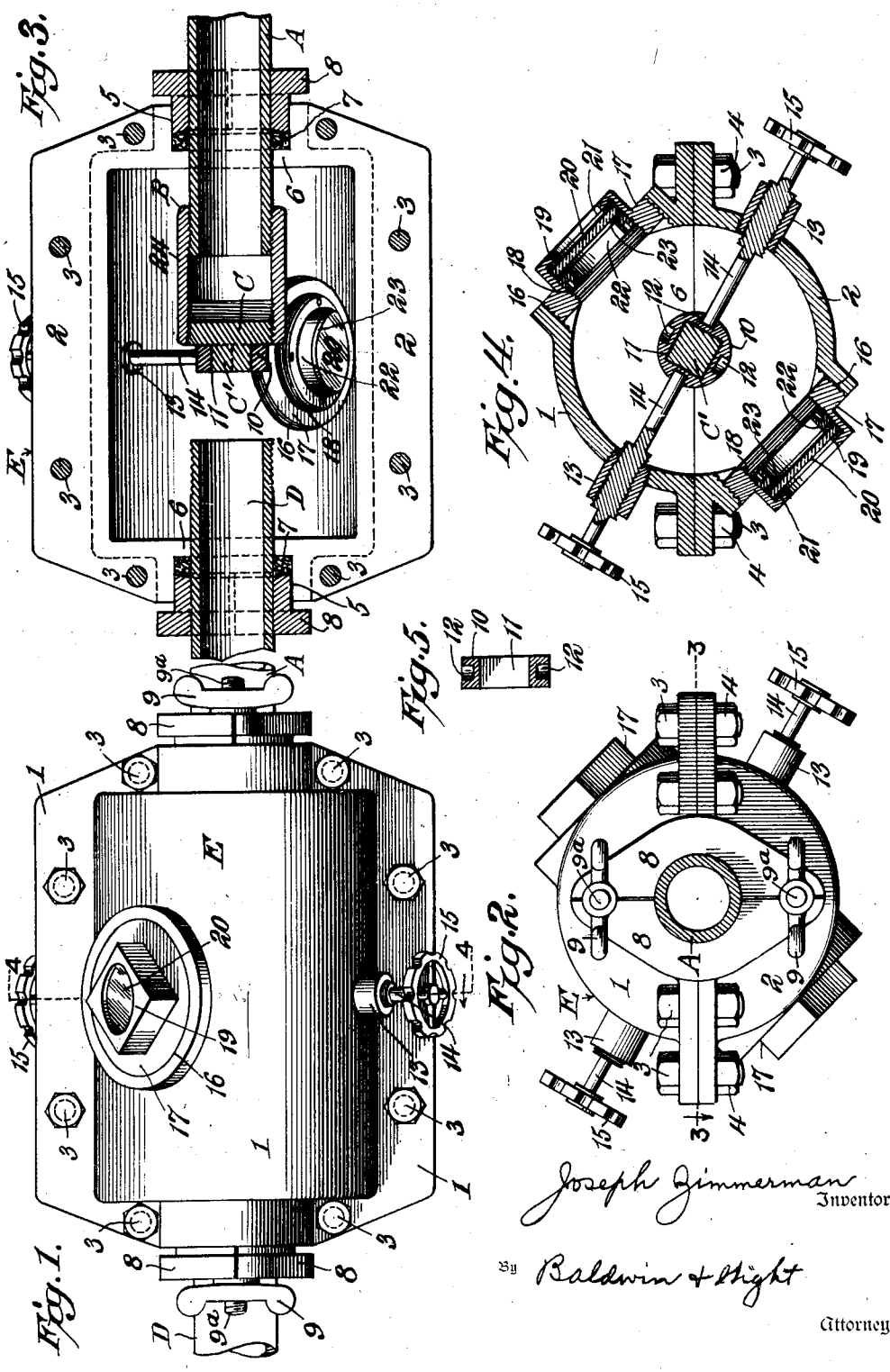
Joseph Zimmerman
Inventor
By Baldwin + Wight
Attorneys Patented Mar. 26, 1929.

1,706,687

UNITED STATES PATENT OFFICE.

JOSEPH ZIMMERMAN, OF SAN ANTONIO, TEXAS.

DEVICE FOR FACILITATING THE COUPLING OF PIPES.

Application filed August 6, 1928. Serial No. 297,680.

This invention relates to pipe coupling devices and more particularly to such devices by means of which an additional length of pipe may be connected to a gas or water main without the necessity of shutting off any part of the main from communication with the source of gas or water supply to which the main is connected.

It is usual to provide the end of such mains farthest from the source of supply, or in other words the outer end, with a closure consisting of a pipe coupling threaded at one of its ends to the outside of the pipe and a plug threaded to the inside of the other end of the coupling. When it has been desired to prolong the main pipe line by the addition of one or more lengths of pipe, it has been first necessary to shut off the outer end of the main from communication with the source of supply by means of a valve situated between the outer end and said source, after which the plug may be removed from the coupling at the outer end of the main and the desired number of additional lengths of pipe attached to the main. It has been necessary to shut off the main in this manner in order to prevent gas or water, as the case may be, from escaping from the open outer end of the main during the process of attaching the additional length or lengths of pipe. Quite frequently the valve controlling communication of the main with the source of supply is located at some distance from the outer end of the main and when this valve is closed all pipe lines extending laterally from the main and receiving their supply of gas or water therefrom are thereby shut off from communication with the source of supply. This of course is objectionable in all cases and especially so when the laterals extend into private houses, being in such cases not only inconvenient but also dangerous, for in the case of gas pipes the shutting off of the gas supply will result in putting out the pilot lights on gas stoves, heaters or the like. Under such circumstances, when the addition to the main line has been completed and the gas turned on, the gas will escape from the pilot light burners without being burned, in time filling the room or rooms into which it escapes and possibly resulting in an explosion or in asphyxiation of the occupants of the room or rooms.

The present invention has for its object the overcoming of these difficulties through the provision of a pipe coupling device by means of which additional pipes may be connected to the outer end of a main pipe line without the necessity of shutting off the source of supply in any part of the main.

With this and other objects in view, the nature of which will more fully appear, the invention will be clearly understood by following the description, the appended claims and the several views illustrated in the accompanying drawings in which Figure 1 is a plan view of the pipe coupling device in operative relationship with a main pipe line and an extension therefor, Figure 2 is an end elevation thereof, Figure 3 is a sectional view taken on the line 3—3 of Figure 2, Figure 4 is a sectional view taken on the line 4—4 of Figure 1, and Figure 5 is a sectional view of the socket wrench which fits over the plug.

In the drawings there is shown the pipe coupling device embodying my invention. A main pipe A is closed at its outer end by means of a pipe coupling B and a plug C, as shown in Figure 3, and an additional length of pipe D is in position preparatory to being connected to the main pipe A. There is provided a split casing E comprising an upper half 1 and a lower half 2, which are secured together by means of bolts 3 and clamping nuts 4. The ends of the casing halves 1 and 2 are conjointly formed with alined bores 5, at the inner ends of which are inwardly extending flanges 6, these flanges having an inside diameter slightly greater than the outside diameter of the pipes A and D. Felt or other suitable packing 7 is fitted into the bores 5 and is held against the flanges 6 by means of split packing glands 8, which may be drawn in against the packing by means of winged clamping nuts 9 and threaded studs 9ª which are secured to the casing. The split packing glands 8 have an inside diameter slightly greater than the outside diameter of the pipes A and D, and being split may be positioned in the bores 5 after the casing E has been placed on the pipes A and D. Since the casing E is held from movement relative to the pipes A and D only by the friction of the packing 7, the casing may be rotated about the pipes or moved longitudinally thereof.

A socket wrench 10 provided with a central polygonal opening 11 is adapted to fit over a non-circular projection on the plug C disposed exteriorally of the pipe A and has a plurality of peripheral recesses 12, which recesses are spaced to form pairs of diametrically opposite recesses.

Threadably mounted at diametrically opposite points in each of the split casing halves 1 and 2 are sleeves 13 in which are threaded stems 14, which stems are in alinement one with the other and extend radially from the center of the casing E. On the outer end of each stem is a hand wheel 15 which facilitates the turning of the stem, by which turning the stem is caused to move inwardly or outwardly as may be desired.

Each of the casing halves is further provided with an opening 16 into which is threaded an inspection plug 17. These plugs are each provided with a threaded bore 18 and with an inwardly extending flange 19. A transparent disk 20, preferably of glass, fits into each bore 18, is separated from the flange 19 by a rubber gasket 21, and is held against this gasket by means of a round nut 22 threaded into the bore 18, a second rubber gasket 23 being interposed between the transparent disk and the nut, thus providing a pressure tight joint between the plug and the disk.

When it is desired to connect the additional length of pipe D to the main pipe A, it is first necessary to position the pipe D approximately in alinement with the pipe A and at a short distance therefrom, as shown in Figures 1 and 3. The outer end of pipe D is of course at this time closed by means of a coupling and a plug similar to the coupling B and the plug C now closing the end of the pipe line A. The plug C is then slightly loosened within the coupling B. The two split casing halves are placed over the pipes A and D and positioned so that the ends of both pipes lie within the chamber formed by the casing, the casing halves being then tightly clamped together by means of the clamping nuts 4. The packing 7 is then inserted in the bores 5 and the split packing glands 8 positioned in said bores and drawn against the packing by means of the winged nuts 9.

One of the inspection plugs 17 in the casing E is removed and the socket wrench 10 placed over the angular projection C' of the plug C. The casing is then moved to a position in which the stems 14 will lie in the same transverse plane as the centers of the recesses 12 in the socket wrench 10. The casing is then turned about the pipes as an axis until a pair of the recesses 12 register with the stems 14, the stems being then screwed inwardly until their ends enter said pair of recesses.

It is now desired to remove the plug C and connect the pipe D to the pipe A. The inspection plug 17 is replaced and the casing E thereby forms a pressure tight seal about the ends of the pipes A and D which lie within the casing chamber. The casing is then turned about the pipes as an axis and the stems 14 being in engagement with the socket wrench 10 cause the wrench to rotate with the casing, which in turn causes the plug C to be rotated with the coupling B. The direction of rotation is of course that which will unscrew the plug C. While the casing is being thus rotated the operator will look through the inspection plug 17 and be thereby enabled to determine how far the plug C has become unscrewed and whether or not the stems 14 and the socket wrench 10 are remaining in their proper operative relationship to the plug C. As the plug unscrews it will be necessary to move the casing E longitudinally of the pipes and in the direction in which the plug is moving in order that the stems 14 will stay in engagement with the socket wrench 10. When the plug C has in this way been completely unscrewed it may drop out of the wrench 10 and fall onto the casing E, or, in the event that the plug sticks in the wrench, the stems 14 are screwed outwardly so that they disengage the recesses in the socket wrench, at which time the wrench and coupling will both fall onto the casing E. Gas from the main pipe line A will now enter the casing E and the pipe D. It is to be noted that this causes no drop in the pressure existing in the system, nor does it affect the conditions in the system in any other way. The pipe D is then moved towards the center of the casing and screwed into the coupling B, it being possible to make the connection easily since the inspection plugs 17 allow the operator to see just what he is doing.

It is obvious that if the additional length of pipe D be relatively short and straight so as to be conveniently rotatable it will not be necessary for the casing to rotate with respect to this pipe. In other words, the pipe may be rotated with the casing or may be held stationary and the casing caused to rotate with respect thereto according to which procedure is the more convenient in any particular case.

The pipe D now having been joined to the main pipe A, the packing glands 8 are removed and the casing halves 1 and 2 unbolted and likewise removed. Of course the small amount of gas which was contained in the chamber of the casing E during the process of connecting the two pipes will escape upon the opening of the casing, but this gas is negligible in amount.

It is apparent that I have provided a pipe coupling device which accomplishes the objects set forth above and which is light, of simple and inexpensive construction, and which requires little skill for its efficient operation. The inspection plugs afford sealed sight openings and make it possible for the operator to unscrew the plug with ease, and to then connect the two pipes together without the difficulty of crossing threads and obtaining a resultingly poor connection. By the use of my device it is possible to add an extension to any pipe line in a fluid distributing system without in any way altering the conditions throughout the system.

While I have shown one embodiment of my invention, it is of course to be understood that the details of structure and arrangement of parts may be variously changed and modified without departing from the spirit and scope of my invention.

I claim:

1. A device for facilitating the coupling of pipes comprising a casing formed to surround and enclose the spaced adjacent end portions of a pair of alined pipes; and means to mount said casing in substantially fluid tight relation on the end portions of said pipes while permitting relative rotary movement between the casing and one of the pipes; in combination with means connected to the casing and adapted to engage a rotary closure means for the enclosed end portion of one of said pipes and operative by rotation of the casing to detach the pipe closure.

2. A device for facilitating the coupling of pipes comprising a casing formed to surround and enclose the spaced adjacent end portions of a pair of alined pipes; and means adapted to mount said casing in substantially fluid tight relation on the end portions of said pipes while permitting relative rotary movement between the casing and one of the pipes and axial movement of at least one of the pipes; in combination with means connected to the casing and adapted to engage a rotary closure means for the enclosed end portion of one of said pipes and operative by rotation of the casing to detach the pipe closure.

3. A device for facilitating the coupling of pipes comprising a casing formed to surround and enclose the spaced adjacent end portions of a pair of alined pipes; and means adapted to mount said casing in substantially fluid tight relation on the end portions of said pipes while permitting relative rotary movement between the casing and one of the pipes; in combination with means connected to the casing and adapted to engage a threaded plug closing the enclosed end of one of said pipes, and operative by rotation of the casing to unscrew the plug.

4. A device for facilitating the coupling of pipes comprising a casing formed to surround and enclose the spaced adjacent end portions of a pair of alined pipes, the enclosed end of one of said pipes being provided with a threaded closure plug having a non-circular projection exterior of said pipe; and means adapted to mount said casing in substantially fluid tight relation on the pipes, while permitting relative rotary movement between the casing and one of the pipes; in combination with a wrench fitting over said non-circular projection; and means connected to the casing and adapted to engage said wrench and operative by rotation of the casing to unscrew said plug.

5. A device for facilitating the coupling of pipes comprising a casing formed to surround and enclose the spaced adjacent end portions of a pair of alined pipes, the enclosed end of one of said pipes being provided with a threaded closure plug having a non-circular projection exterior of said pipe; and means adapted to mount said casing in substantially fluid tight relation on the pipes, while permitting relative rotary movement between the casing and one of the pipes; in combination with a wrench fitting over said non-circular projection; and a stem carried by said casing and movable radially thereof for engagement with said wrench, and operative by the rotation of said casing to unscrew the plug.

6. A device for facilitating the coupling of pipes comprising a casing formed to surround and enclose the spaced adjacent end portions of a pair of alined pipes, the enclosed end of one of said pipes being provided with a threaded closure plug having a non-circular projection exterior of said pipe; and means adapted to mount said casing in substantially fluid tight relation on the pipes, while permitting relative rotary movement between the casing and one of the pipes and axial movement of at least one of the pipes; in combination with a wrench fitting over said non-circular projection; and a stem carried by said casing and movable radially thereof for engagement with said wrench, and operative by the rotation of said casing to unscrew the plug.

In testimony whereof, I have hereunto subscribed my name.

JOSEPH ZIMMERMAN.